(12) United States Patent
Molnar et al.

(10) Patent No.: US 10,605,916 B2
(45) Date of Patent: Mar. 31, 2020

(54) DEPTH FIELD IMAGING APPARATUS, METHODS, AND APPLICATIONS

(71) Applicant: CORNELL UNIVERSITY, Ithaca, NY (US)

(72) Inventors: Alyosha Molnar, Ithaca, NY (US); Suren Jayasuriya, Princeton Junction, NJ (US); Sriram Sivaramakrishnan, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 15/554,550

(22) PCT Filed: Mar. 17, 2016

(86) PCT No.: PCT/US2016/022741
§ 371 (c)(1),
(2) Date: Aug. 30, 2017

(87) PCT Pub. No.: WO2016/149438
PCT Pub. Date: Sep. 22, 2016

(65) Prior Publication Data
US 2019/0033448 A1     Jan. 31, 2019

Related U.S. Application Data

(60) Provisional application No. 62/134,122, filed on Mar. 17, 2015.

(51) Int. Cl.
*G01S 17/02*     (2006.01)
*G01S 17/89*     (2020.01)
(Continued)

(52) U.S. Cl.
CPC .......... *G01S 17/023* (2013.01); *G01S 7/4814* (2013.01); *G01S 7/4816* (2013.01); *G01S 7/4914* (2013.01);
(Continued)

(58) Field of Classification Search
CPC .... G01S 17/023; G01S 7/4814; G01S 7/4816; G01S 7/4914; G01S 17/46; G01S 17/89;
(Continued)

(56) References Cited

U.S. PATENT DOCUMENTS 6,825,455 B1   11/2004   Schwarte
6,925,455 B2    8/2005   Gong et al.
(Continued)

FOREIGN PATENT DOCUMENTS

JP   2000-517427   12/2000
JP   2008-191661    8/2008
(Continued)

OTHER PUBLICATIONS

International Search Report and Written Opinion Form PCT/ISA/210, International Applicaiton No. PCT/US2016/022741, pp. 1-10, International Filing Date Mar. 17, 2016.
(Continued)

*Primary Examiner* — John R Schnurr
(74) *Attorney, Agent, or Firm* — Bond, Schoeneck & King, PLLC; Blaine Bettinger; William Greener (57) ABSTRACT

A depth of field imaging apparatus includes a light field imager and a time of flight imager combined in a single on-chip architecture. This hybrid device enables simultaneous capture of a light field image and a time of flight image of an object scene. Algorithms are described, which enable the simultaneous acquisition of light field images and a time
(Continued)

of flight images. Associated hybrid pixel structures, device arrays (hybrid imaging systems), and device applications are disclosed.

24 Claims, 6 Drawing Sheets

(51) Int. Cl.
G01S 7/481 (2006.01)
G01S 7/4914 (2020.01)
G01S 17/46 (2006.01)
H04N 13/106 (2018.01)
H04N 13/254 (2018.01)
H04N 5/374 (2011.01)

(52) U.S. Cl.
CPC .............. *G01S 17/46* (2013.01); *G01S 17/89* (2013.01); *H04N 5/374* (2013.01); *H04N 13/106* (2018.05); *H04N 13/254* (2018.05); *H04N 2213/001* (2013.01)

(58) Field of Classification Search
CPC .... H04N 13/106; H04N 13/254; H04N 5/374; H04N 2213/001
See application file for complete search history.

(56) References Cited

U.S. PATENT DOCUMENTS

| | | | |
|---|---|---|---|
| 8,767,047 | B2 | 7/2014 | Molnar et al. |
| 8,809,758 | B2 | 8/2014 | Molnar et al. |
| 9,110,240 | B2 | 8/2015 | Gill et al. |
| 2011/0174998 | A1* | 7/2011 | Molnar ............... G01S 3/782 250/550 |
| 2013/0222582 | A1* | 8/2013 | Mohan ............... H04N 5/225 348/143 |
| 2013/0234029 | A1* | 9/2013 | Bikumandla ......... H01L 25/043 250/349 |
| 2015/0061065 | A1* | 3/2015 | Gill ................... H01L 27/14623 257/432 |
| 2016/0099429 | A1* | 4/2016 | Bruder ............... H01L 27/307 348/374 |

FOREIGN PATENT DOCUMENTS

| | | |
|---|---|---|
| JP | 20011-164095 | 8/2011 |
| JP | 2013-520006 | 5/2013 |
| JP | 2013-5388342 | 10/2013 |
| JP | 2014-197824 | 10/2014 |
| WO | 2006039486 | 4/2006 |
| WO | 2007044725 | 4/2007 |
| WO | 2007092545 | 8/2007 |
| WO | 2007092581 | 8/2007 |
| WO | 2012058360 A2 | 5/2012 |
| WO | 2014122506 A1 | 8/2014 |
| WO | 2014137922 | 9/2014 |
| WO | 2014198625 A1 | 12/2014 |
| WO | 2015025497 | 2/2015 |

OTHER PUBLICATIONS

Tao, M. W., et al., Depth from combining defocus and correspondence using light-field cameras, IEEE International Conference on Computer Vision (ICCV), pp. 673-680; 2013.
Gill, Patrick R., et al., Lensless Ultra-Miniature Imagers Using Odd-Symmetry Spiral Phase Gratings, Imaging and Applied Optics, Optical Society of America 2013, 3 pages.
Tadano, Ryuichi, et al., Depth Selective Camera: A Direct, On-Chip, Programmable Technique for Depth Selectivity in Photography, In IEEE International Conference on Computer Vision, pp. 3595-3603; 2015.
Hirsch, Matthew, et al., A Switchable Light Field Camera Architecture with Angle Sensitive Pixels and Dictionary-based Sparse Coding, Year: 2014 IEEE International Conference on Computational Photography (ICCP), vol. 1, pp. 1-10; 2014.
Office Action Summary in corresponding Japanese Application No. 2017-548977 dated Feb. 4, 2020.

\* cited by examiner

DEPTH FIELD IMAGING APPARATUS, METHODS, AND APPLICATIONS

RELATED APPLICATION DATA

This application is a US National Phase filing of International Application No. PCT/US2016/022741 filed Mar. 17, 2016 which itself claims priority to U.S. provisional application No. 62/134,122 filed Mar. 17, 2015, the subject matter of which is incorporated by reference in its entirety.

GOVERNMENT FUNDING

Funding for the invention was provided by the National Science Foundation under award 1150329, National Science Foundation under award DGE-1144153 and DARPA under award 660011014028. The government has certain rights in the invention.

BACKGROUND OF THE INVENTION

Field of the Invention

Aspects and embodiments of the invention are generally in the field of image sensing. More particularly, aspects and embodiments relate to depth field imaging apparatus, components, methods, and applications thereof.

Description of Related Art

The introduction of depth sensing to capture 3D information has led to its ubiquitous use in imaging and camera systems, and has been a major focus of research in computer vision and graphics. Depth values enable easier scene understanding and modeling which in turn can realize new computer vision systems and human-computer interaction. Many methods have been proposed to capture depth information such as stereo, photometric stereo, structured illumination, light field (LF), RGB-D, and time-of-flight (TOF) imaging. However depth cameras typically support only one depth sensing technology at a time, which limits their robustness and flexibility.

Each imaging modality has its own advantages and disadvantages for attributes such as on-chip implementation, cost, depth resolution, etc. that are summarized in Table 1.

TABLE 1

Table that summarizes the relative advantages and disadvantages of different depth sensing modalities including the propsed depth fields.

| Feature | Stereo | Photometric Stereo | Structure Illumination | Light Field | Time-of-Flight | Depth Fields (proposed) |
|---|---|---|---|---|---|---|
| On-chip pixel implementation | No | No | No | Yes | Yes | Yes |
| Illumination source | Passive | Active | Active | Passive | Active | Active |
| High resolution depth maps | No | Yes | Yes | No | Yes | Yes |
| Texture needed for depth | Yes | No | No | Yes | No | No |
| Ambiguity in depth measurement | No | Yes | No | No | Yes | No |

The inventors recognize that hybrid 3D imaging systems, which utilize two or more depth sensing techniques, would provide solutions overcoming these individual limitations. Furthermore, a system that combines modalities with an on-chip implementation would be cost effective and mass producible, allowing ubiquitous robust depth sensing.

Light field (LF) imaging captures 4D representations of the plenoptic function parametrized by two spatial coordinates and two angular coordinates, or equivalently as the space of non-occluded rays in a scene. Light fields are used for image-based rendering and modeling, synthesizing new viewpoints from a scene, and estimating depth from epipolar geometry. In the context of cameras, light fields have been captured by using mechanical gantries or large dense camera arrays, or by single-shot methods including microlenses, coded apertures, transmission masks, or diffraction gratings including symmetric and anti (odd)-symmetry phase gratings. Light fields can extend the depth of field and use digital refocusing to synthesize different apertures in post-processing, thus enabling a level of software control after the photograph has been taken. The subject matter disclosed in co-owned U.S. Pat. Nos. 8,530,811, 8,809,758, and 8,767,047, which disclose light field (LF) imaging apparatus and methods utilizing angle sensitive pixels (ASPs) is incorporated by reference herein in its entirety. The subject matter of U.S. Pat. No. 9,110,240, U.S. application 20150061065, WO2006039486, WO2007092581, WO2007092545, and WO2007044725 is incorporated by reference herein in its entirety.

Time-of-flight (TOF) imaging works by encoding optical path length traveled by amplitude modulated light, which is recovered by various devices including photogates and photonic mixer devices. Specifically, a light source (normally a LED in the near-infrared regime (approx. 840-1000 nm) is amplitude modulated at a certain frequency. This light illuminates the scene, and when this amplitude-modulated light bounces off an object and arrives back at an image sensor it acquires a phase delay corresponding to the depth of that object. To detect this phase delay, most sensors use a type of pixel known as a photogate, which consists of polysilicon over p substrate in a CMOS process. These photogates are modulated at the same frequency as the light source, and the amount of charge they collect at each pixel is directly proportional to the phase delay. Thus an array of photogates can capture an image where each pixel in the image has a depth number. While yielding high resolution depth maps, single frequency TOF suffers from limitations including phase wrapping ambiguity and multipath interference caused by translucent objects and scattering media. Proposed techniques to overcome these limitations include phase unwrapping with multi-frequency methods, global/direct illumination separation, deblurring and super-resolution, and mitigating multipath interference with post-processing algorithms. Recently, new temporal coding patterns for these sensors help resolve multiple optical paths to enable seeing light in flight and looking through turbid media. Camera systems have been proposed to fuse together TOF+stereo, TOF+photometric stereo, and TOF+polarization.

Fusion of depth maps and intensity images has been used to enable 3D reconstruction by explicit feature detection. Real-time interaction for camera tracking and 3D reconstruction have been demonstrated via KinectFusion. While conceptually similar to depth fields by acquiring per-pixel values of depth and intensity, these fusion methods do not systematically control the spatio-angular sampling or transcend the traditional capture tradeoffs between aperture and depth of field for depth imaging.

The inventors have recognized the advantages and benefits achievable by combining light field (LF) and TOF imaging into a single, on-chip, hybrid 3D imaging system. Such a system would inherit light field advantages such as post-capture digital refocusing with TOF advantages of high resolution depth information and the mitigated multipath interference using coded signals. Furthermore, LF and TOF imaging both have been implemented on-chip, and one could design hybrid pixel structures to combine both modalities on-chip as well. Each modality has its relative disadvantages: depth from light fields require textured surfaces and is dependent on object distance for disparity, and single frequency TOF imaging suffers from phase wrapping and is limited to small aperture cameras with low shutter speeds. However, the embodied hybrid LF/TOF imaging apparatus and methods, referred to herein as 'depth field' imaging (apparatus and methods) can alleviate all of these limitations.

SUMMARY

An aspect of the invention is a depth field imaging apparatus. According to an embodiment, the depth field imaging apparatus includes a light field (LF) imaging component that can acquire a LF image of a scene; a time-of-flight (TOF) imaging component that can acquire a TOF image of the scene, wherein the LF imaging component is disposed over the TOF imaging component and both are implemented in a single on-chip architecture; and an image processing component programmed to operationally execute an algorithm that enables the simultaneous acquisition of the LF image and the TOF image by the depth field imaging apparatus. In various non-limiting embodiments, the depth field imaging apparatus may further include or be further characterized by the following features or limitations, alone or in various non-limiting combinations:
wherein the LF imaging component comprises a grating;
　wherein the LF imaging component comprises a metallic grating;
　wherein the grating is a periodic grating;
　wherein the grating is a phase grating;
　　wherein the grating is an anti-(odd)-symmetry phase grating;
wherein the LF imaging component comprises an amplitude mask;
wherein the LF imaging component is an angle sensitive pixel (ASP);
wherein the TOF imaging component comprises a modulatable photogate including an active (modulatable) light source;
　wherein the TOF imaging component comprises a plurality of interleaved photogates;
　　wherein the plurality of interleaved photogates is characterized by being modulated at a modulation frequency of the active light source;
further including a lens disposed on an object side of the depth field imaging apparatus;
the depth field imaging apparatus implemented in a CMOS architecture.

According to an embodiment, the depth field imaging apparatus includes a light field (LF) imaging component; and a time-of-flight (TOF) imaging component, wherein both the LF imaging component and the TOF imaging component are implemented in a single on-chip architecture.

An aspect of the invention is a depth field pixel structure. According to an embodiment, the depth field pixel structure includes a light field (LF) imaging component; a photogate; and an active light source optically coupled to the photogate, wherein the LF imaging component is disposed over the photogate and the pixel structure is implemented in a single on-chip architecture.

An aspect of the invention is a depth field imaging system. According to an embodiment, the depth field imaging system includes an array of depth of field pixel structures wherein each depth field pixel structure includes a light field (LF) imaging component, a photogate, and an active light source optically coupled to the photogate, wherein the LF imaging component is disposed over the photogate and each pixel structure is implemented in a single on-chip architecture. In various non-limiting embodiments, the depth field imaging system may further include or be further characterized by the following features or limitations, alone or in various non-limiting combinations:
further comprising a lens disposed between an object scene and the array of depth of field pixel structures;
further comprising a global shutter.

An aspect of the invention is an imaging method. According to an embodiment, the imaging method involves the steps of acquiring a LF image of an object scene; simultaneously acquiring a TOF image of the object scene, wherein the LF and TOF images are simultaneously acquired by a single on-chip implemented, hybrid image sensing device; and processing the acquired LF and TOF images to form a depth field image of the object scene. In various non-limiting embodiments, the imaging method may further include or be further characterized by the following steps, features or limitations, alone or in various non-limiting combinations:
further comprising acquiring the LF and TOF images in a single exposure;
further comprising acquiring the depth field image using a digital refocusing technique;
further comprising acquiring the depth field image using a phase unwrapping technique.

As used herein and in the claims, the TOF component is assumed to include an active (modulatable) light source.

BRIEF DESCRIPTION OF THE DRAWINGS

FIG. 7B depicts a binary odd-symmetry phase grating.

DETAILED DESCRIPTION OF NON-LIMITING, EXEMPLARY EMBODIMENTS OF THE INVENTION

Aspects of the invention include an integrated hybrid imaging system comprising a light field (LF) imaging component and a time-of-flight (TOF) imaging component, advantageously in CMOS architecture, a LF/TOF pixel structure referred to herein as an Angle Sensitive Photogate (ASPG), and a method for simultaneously acquiring LF and TOF images with a single, integrated device. Both LF and TOF imaging component/systems are known in the art and neither of these components per se form inventive aspects of the embodied invention.

Patented LF imaging systems and methods utilizing angle sensitive pixels (ASPs), co-invented and owned by applicant are referenced above. These LF image sensors/methods utilized diffraction gratings disposed above photodiodes. A photodiode is typically a junction capacitance caused by the interface of n/p silicon. The n-doped region is held at a high voltage relative to the p-silicon, causing the area to become photoactive and generate current proportional to the amount of photons hitting it.

In distinction to a photodiode, a photogate consists of a polysilicon gate over thin field oxide (usually $SiO_2$) and the oxide is over silicon. The gate is modulated by a voltage, which combined with an active light modulation creates a current signal proportional to the phase of the light's amplitude.

As photogates are not used for typical scene imaging (as in a traditional camera or LF/ASP image sensor), it was not foreseeable to use a photogate in place of a photodiode in an ASP. In fact, since photodiodes do not require modulation, technical disincentives taught away from their use in LF sensors.

The inventors recognized, however, that in addition to the ability to perform TOF imaging using a voltage-modulated photogate, the photogate will act like a photodiode when the gate voltage is held constant. As such, photogates can perform both regular imaging and TOF imaging; moreover, when diffraction gratings are incorporated over these devices, then they can perform both LF imaging and TOF imaging. To perform LF imaging and TOF imaging simultaneously, TOF imaging can be inverted mathematically to recover a regular image and a TOF depth image. This is described in greater detail below.

The integrated hybrid LF/TOF imaging system, component (pixel), and method (simultaneous LF and TOF imaging) are referred to herein as 'depth field' imaging (systems, pixels, methods). The embodied depth field imaging system inherits LF system advantages such as post-capture digital refocusing with TOF advantages of high resolution depth information and mitigated multipath interference using coded signals. Further, LF and TOF imaging both have been implemented on-chip, and an embodied hybrid pixel structure is able to combine both modalities on-chip as well. Although each modality has its relative disadvantages: depth from light fields require textured surfaces and is dependent on object distance for disparity, and single frequency TOF imaging suffers from phase wrapping and is limited to small aperture cameras with low shutter speeds, the embodied depth field apparatus and methods can alleviate all of these limitations.

Figure 1:
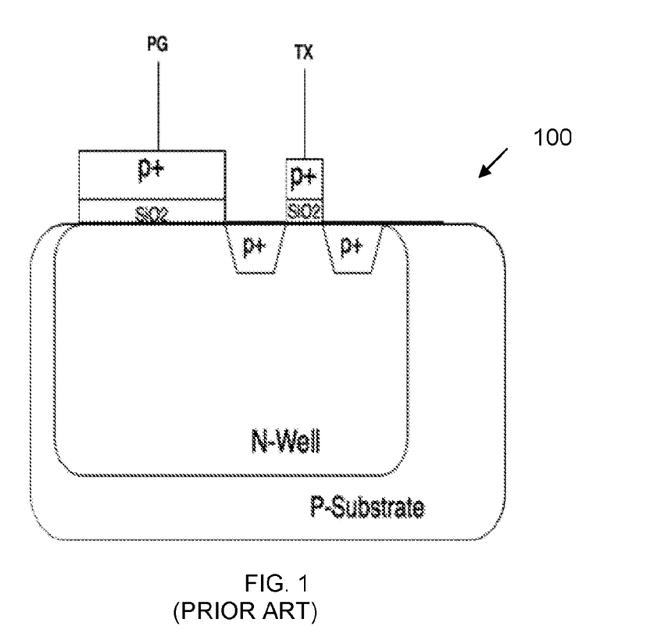
FIG. 1 is a schematic cross sectional drawing of a photogate as known in the art and used in accordance with an embodiment of the invention.

FIG. 1 is a schematically illustrates a photogate 100 utilized in the TOF component of the embodied depth field system (imaging system or pixel component). The photogate 100 consists of polysilicon gate (PG) over $SiO_2$ over silicon (P-substrate) in a CMOS process. When the gate is modulated by a voltage, combined with synchronized active (i.e., modulatable) light (illumination) modulation, a current signal is created that is proportional to the phase of the light's amplitude.

Figure 2:
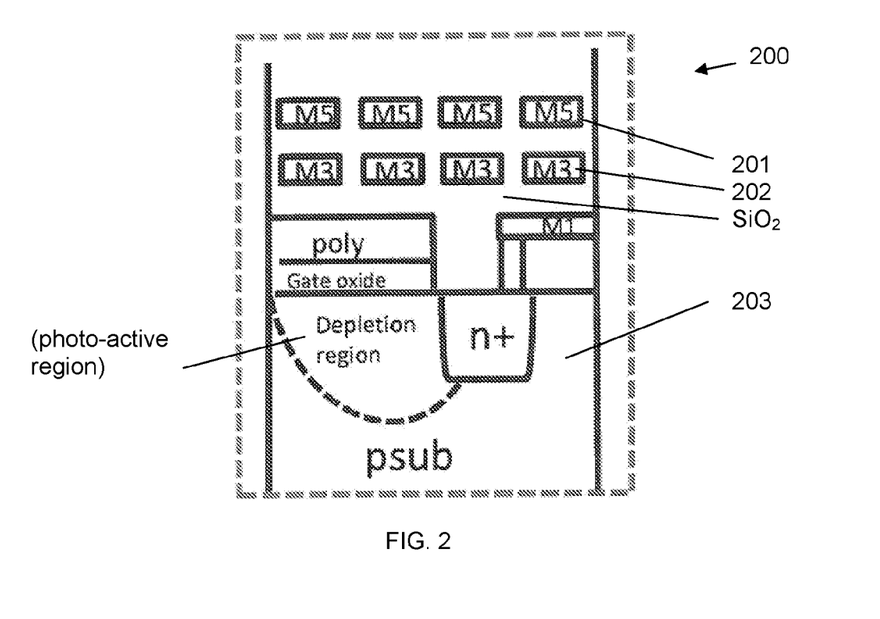
FIG. 2 is a schematic cross sectional drawing of a depth field pixel in CMOS architecture in accordance with an embodiment of the invention.

FIG. 2 is a schematic cross sectional drawing of a depth field pixel (Angle Sensitive Photogate 'ASPG') 200 in CMOS architecture in accordance with an embodiment of the invention. The pixel 200 comprises two periodic metal diffraction gratings (M5, M3) 201, 202 in $SiO_2$ over representative photogate 203.

Figure 3:
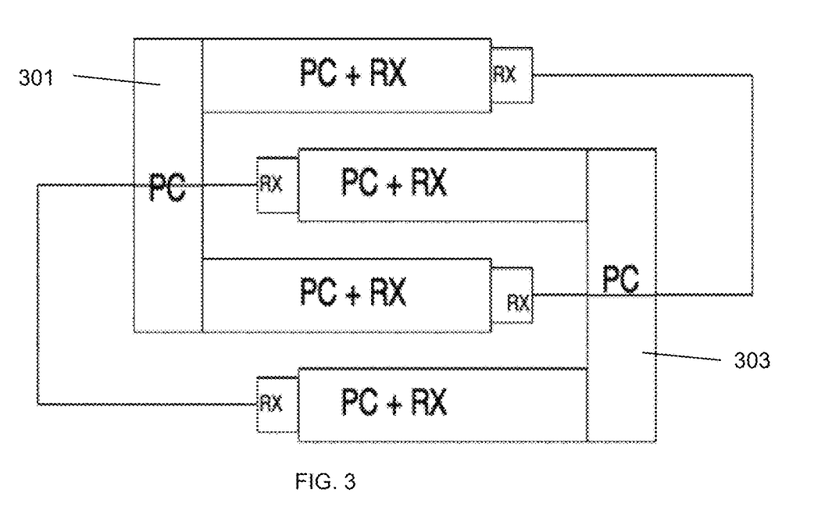
FIG. 3 is a schematic top plan view of two interleaved photogates as used in accordance with an embodiment of the invention.

FIG. 3 is a schematic top plan view of two interleaved photogates 301, 303 as used in accordance with an embodiment of the invention. In the figure, PC=Polysilicon, RX=diffusion area, PC+RX=gate of a MOSFET over its channel, RX alone=source/drain of a transistor (either P+ or N+ region). In device implementation, gratings (not shown here) are located on top of this device in the horizontal direction, at the same pitch as the interleaved photogates.

Figure 4:
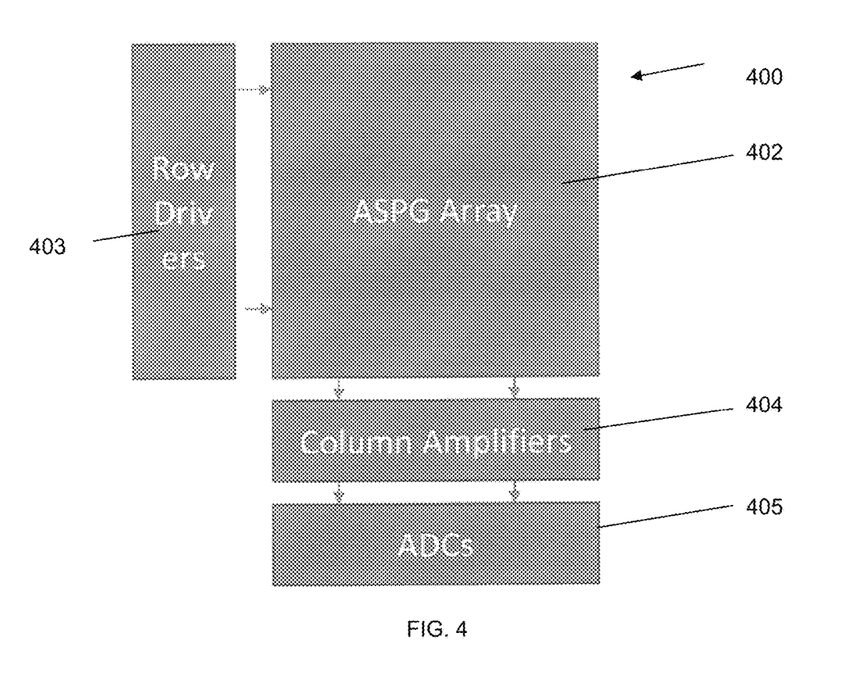
FIG. 4 is a schematic block diagram of a depth field imaging system architecture in accordance with an embodiment of the invention.

FIG. 4 shows a schematic block diagram of a depth field imaging system architecture 400 in accordance with an embodiment of the invention. The system 400 comprises an ASPG array 402, row-drivers 403 and column amplifiers 404 coupled to the array, and A/D converters 405. It will be appreciated by those skilled in the art that a global shutter, as opposed to a rolling shutter, could be implemented to expose the whole image sensor at once, and then read out by rows.

Figure 5:
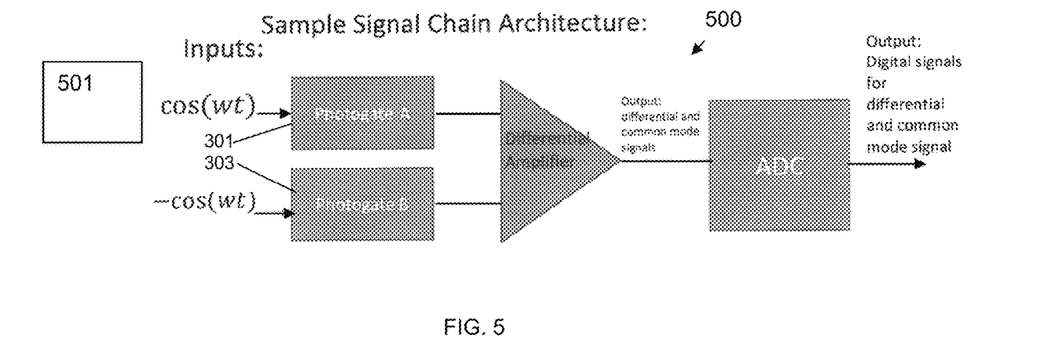
FIG. 5 is a schematic block diagram of a depth field imaging system signal chain architecture in accordance with an exemplary embodiment of the invention.

FIG. 5 shows a schematic block diagram of a depth field imaging system signal chain architecture 500 in accordance with an exemplary embodiment of the invention. In an illustrative aspect, an active (modulatable) light source 501 (e.g., a laser with output amplitude A, modulated by a sinewave (or square wave) at modulation frequency, $f_m$, in the form $A \sin[2\pi f_m t]$, illuminates and bounces off the object scene, the returned light acquiring a phase lag $A \sin[2\pi f_m t - \varphi]$, where Depth=$c\varphi/4\pi f_m$. The interleaved photogates 301, 303 modulated at $f_m$ generate a differential voltage V0 (and then V90 for $f_m$+90 degrees). To first order, $\varphi$=a tan (V90/V0) (where the maximum range is $c/2f_m$ and resolution is proportional to $f_m$).

Figure 6:
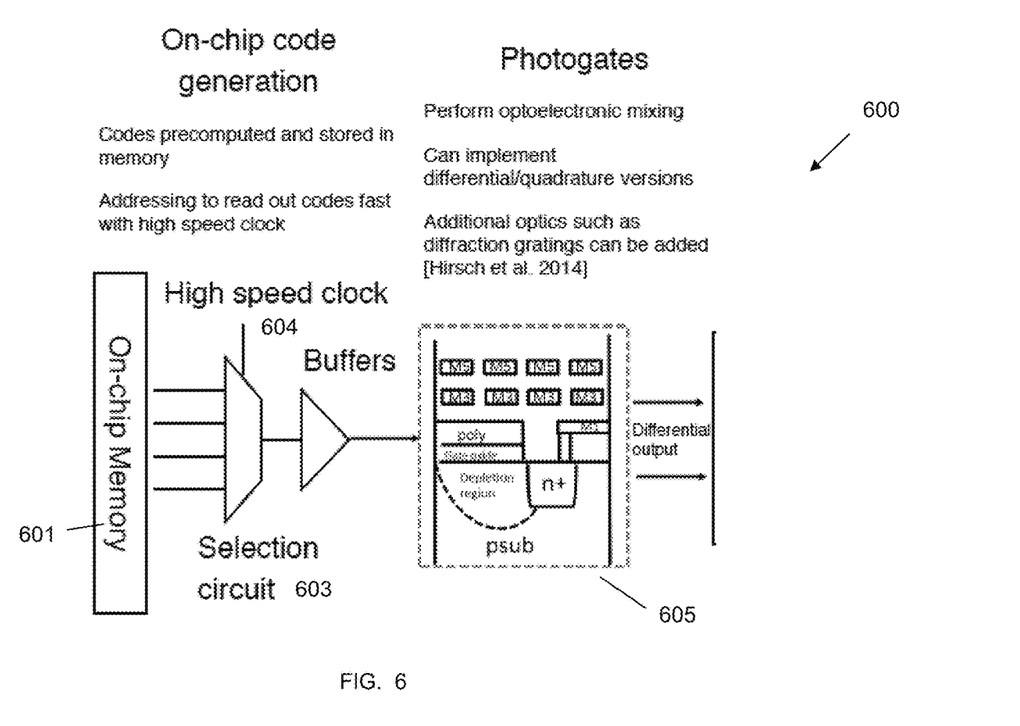
FIG. 6 is a schematic block diagram of an on-chip modulator architecture of a depth field imaging system in accordance with an exemplary embodiment of the invention.

FIG. 6 is a schematic block diagram of an on-chip modulator architecture 600 of a depth field imaging system in accordance with an exemplary embodiment of the invention. To generate TOF modulation including sinusoidal and random binary patterns, the TOF modulation can be stored locally in on-chip memory 601 enabling quick access of this memory to drive the photogates 605 using a selector circuit 603 driven by a high speed clock 604. This design enables fast frequency switching for the TOF modulation signals which improves the depth sensitivity of the TOF imaging.

Below we describe the mathematical formulations of LF and TOF imaging into the concept of a depth field. We show both how to capture these fields and how to invert the forward model to recover light albedo, defined as the reflectance value of an object with respect to the active illumination, and depth as a function of 2D spatial coordinates and 2D angular coordinates.

To describe the forward model for capturing depth fields, we first discuss the forward models for LF and TOF imaging.

Light Fields

Light fields are commonly parameterized by the two plane model l(u, v, x, y) where (u, v) are the angular coordinates at the lens plane, and (x, y) are the spatial coordinates of the sensor plane. The output of this function represents the radiance of the ray parametrized by its intersection with the two planes. The forward model for light field capture has been modeled in the literature as follows:

$$i_{LF}(x,y) = \int_u \int_v m(u,v,x,y) \cdot l(u,v,x,y) du dv \quad (1)$$

where $i_{LF}(x, y)$ is the intensity measured by the detector and m(u, v, x, y) is the modulation/multiplexing function that encodes the incoming light rays. The modulation function represents the different optical elements that could be used to sense the light field including pinholes (m(u, v, x, y)=δ(u, v, x, y)), Fourier masks, random codes/masks, or diffraction gratings where the modulation functions are Gabor wavelets. Discretizing the above equation, $i_{LF}$=Ml where $i_{LF}$, l are the vectorized images and light fields, and M is the modulation matrix, and both linear and nonlinear inversions can recover back the light field.

Time of Flight Imaging

In contrast, TOF is typically modeled using a cross-correlation between the incoming light signal and the reference code sent to the sensor. Given that incoming light is of the form: 1+α cos ($f_M t+\varphi(x, y)$), where φ is the phase accumulated due to the optical path traveled from light source to object to camera and α is the albedo, the intensity at the sensor (normalized to integration time) is:

$$i_{TOF}(\tau, x, y) = (1 + \alpha(x, y)\cos(f_M t + \phi(x, y))) \otimes \cos(f_M t) \approx \quad (2)$$
$$\frac{\alpha(x, y)}{2}\cos(f_M \tau + \phi(x, y)).$$

Here, τ is the cross-correlation parameter which controls the phase shift of the reference signal. By choosing different τ such that $f_M\tau$=0, π/2, π, 3π/2, we can recover both the albedo and the phase φ at each spatial location (x,y) using quadrature inversion:

$$\phi(x, y) = \tan^{-1}\left(\left(i_{TOF}\left(\frac{3\pi}{2}\right) - i_{TOF}\left(\frac{\pi}{2}\right)\right) / (i_{TOF}(\pi) - i_{TOF}(0))\right), \quad (3)$$

$$\alpha = \sqrt{\left(i_{TOF}\left(\frac{3\pi}{2}\right) - i_{TOF}\left(\frac{\pi}{2}\right)\right)^2 + (i_{TOF}(\pi) - i_{TOF}(0))^2}.$$

Note that $d=c\varphi/4\pi f_M$ can directly recover depth d from phase φ for TOF imaging.

Depth Fields

We now discuss the concept of the depth field as the ordered pair of albedo and depth (encoded in phase) (α, φ) that occurs at every (u, v, x, y) spatio-angular coordinate, i.e., α=α(u, v, x, y), φ=φ(u, v, x, y). Note that depth fields are not recoverable from TOF measurements alone since TOF assumes a pinhole camera model, which sample φ and α at a particular fixed (u, v).

The forward model of depth field imaging is described as follows:

$$i(\tau,x,y) = \int_u \int_v m(u,v,x,y) \cdot (1+\alpha(u,v,x,y)\cos(f_M t+\phi(u,v,x,y))) du dv \otimes \cos(f_M t) \quad (4)$$

which is approximately $$i(\tau, x, y) \approx \quad (5)$$
$$\int_u \int_v m(u, v, x, y) \cdot \frac{\alpha(u, v, x, y)}{2} \cdot \cos(f_M \tau + \phi(u, v, x, y)) du dv.$$

To invert this model, we take four measurements $f_M\tau$=0, π/2, π, 3π/2 to get images i(0), i(90), i(180), i(270) at each spatial location. Then we calculate $M^{-1}i(\tau)$ to invert the light field matrix for each of these images (note: this inverse can be either done at lower spatial resolution or using sparse priors or modeling assumptions to retain resolution). Thus we recover albedo and phase mixed together at every (u, v, x, y):

$$D' = \frac{\alpha(u, v, x, y)}{2} \cdot \cos(f_M \tau + \phi(u, v, x, y)). \quad (6)$$

To unmix the albedo and phase, we can perform quadrature inversion on D' for $f_M\tau$=0, π/2, π, 3π/2 as before in TOF to recover the depth field.

Methods to Capture Depth Fields

We describe the potential for single-shot capture of depth fields (note: 'single-shot' is a misnomer since four phase measurements are performed per shot, however such functionality can be built into hardware to work in a single exposure). As in most light field sensors, we can align microlenses above CMOS TOF sensors such as photogates, photonic mixer devices, lateral electric field modulators, and others known in the art. Doing so allows sampling the angular plane by sacrificing spatial resolution at the sensor plane. The main lens can widen its aperture, allowing more light transmission while each of the sub-aperture views underneath the microlenses maintain a large depth of field. This is advantageous since existing TOF cameras sacrifice exposure time to keep a small aperture and large depth of field. Attention should be paid to the fine optical alignment of the microlenses at the conjugate image plane in the camera body. For example, when using a lens having a focal length, f, the depth field sensor should be located at a distance f+Δf (determined empirically; e.g., for f=50 mm, Δf=0.5 to 2 mm).

An alternative embodied depth field sensor can utilize an amplitude mask between the main lens and the sensor plane of photogates to filter incoming angular rays. While allowing less light transmission than microlenses, masks can be designed with different coding patterns for improved reconstruction of the depth field and can be flexibly interchanged within the camera body, unlike fixed optical elements.

Figure 7A:
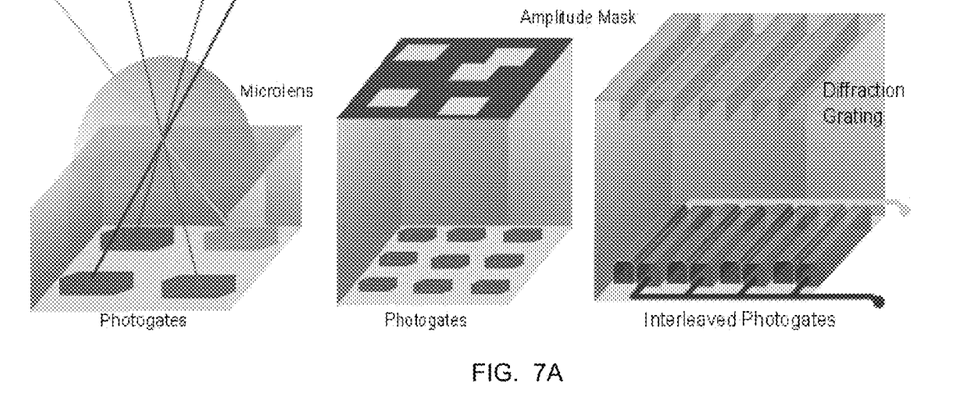
FIG. 7A illustrates three exemplary pixel designs for single-shot camera systems for capturing depth fields. Microlenses, amplitude masks, or diffraction gratings are placed over top of photogates to capture light field and TOF information simultaneously.
Figure 7B:
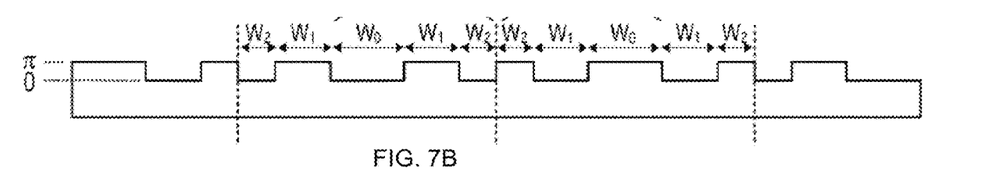
Figure 7C:
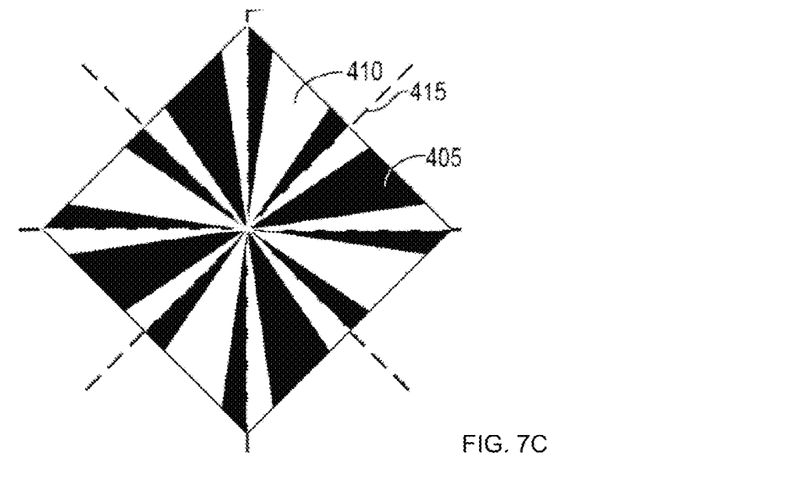
FIG. 7C depicts an odd-symmetry phase grating in which the widths of the segments increase with distance from the center of the grating, all in accordance with exemplary embodiments of the invention.

Another embodiment is a fully integrated CMOS pixel design that does not require alignment of external optical elements but rather uses integrated diffraction gratings over interleaved photogates similar to the above-referenced ASP designs. This sensor works by diffracting the incoming light to form a Talbot pattern that is imaged by the photogates underneath. This ASPG pixel can achieve better light efficiency with phase gratings and reduce its pixel size with interleaved photogates while maintaining the advantages of CMOS integration for cost and mass-production. FIG. 7A illustrates three pixel concept designs for single-shot camera systems for capturing depth fields. Microlenses, amplitude masks, or diffraction gratings are placed over top of photogates to capture light field and TOF information simultaneously. FIG. 7B depicts a binary odd-symmetry phase grating that could be used in an LF imager. FIG. 7C depicts a radial odd-symmetry phase grating in which the widths of the segments increase with distance from the center of the grating.

Figure 8:
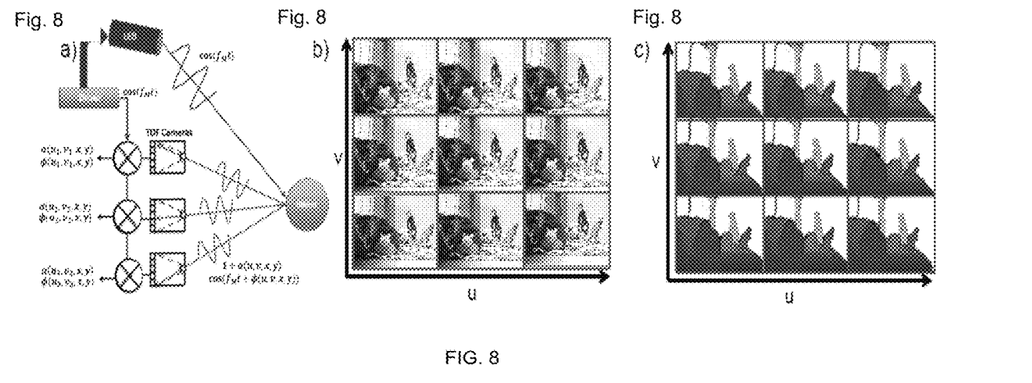
FIG. 8 illustrates: a) Capturing a depth field conceptually using an array of TOF cameras, (b) albedo as 4D function of (u,v,x,y), (c) phase corresponding to TOF depth values as a 4D function of (u,v,x,y), in accordance with an illustrative embodiment of the invention.

FIGS. 8a, 8b, and 8c provide a schematic depiction of depth field capture, in which FIG. 8a illustrates capturing a depth field conceptually using an array of TOF cameras, FIG. 8b shows albedo as a 4D function of (u,v,x,y), and FIG. 8c shows phase corresponding to TOF depth values as a 4D function of (u,v,x,y).

We now describe several new applications of depth fields.

Synthetic Aperture Refocusing

One main disadvantage of TOF imaging is the necessity of a small aperture for large depth of field to yield accurate depth values. Having a shallow depth of field or wide aperture causes optical blur, which corrupts TOF depth values. However, a small aperture limits the shutter speed and increases the acquisition time for these systems. In contrast, light field imaging breaks this tradeoff between depth of field and aperture size by using synthetic aperture refocusing. A plenoptic sensor with microlenses above its pixels can open its aperture and allow more light transmission while keeping the sub-aperture images beneath the microlenses in-focus, albeit at the loss of spatial resolution. After capture, one can digitally refocus the image, thus extending the depth of field by shearing the 4D light field and then summing over (u, v) to synthesize images with different focal planes.

Figure 9:
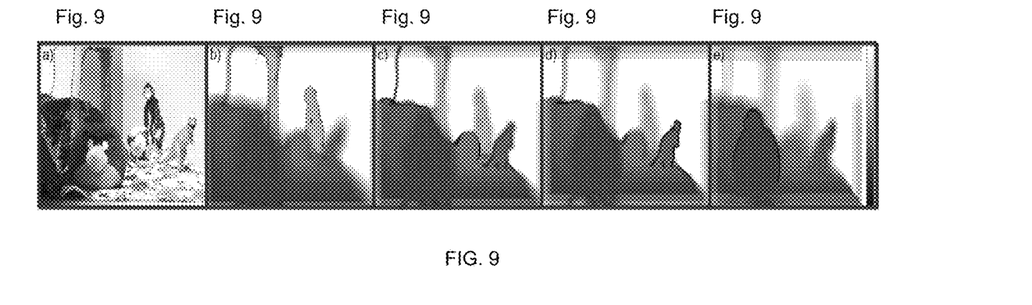
FIG. 9 illustrates: a) Captured scene, b-e) Digital refocusing on different focal planes for the depth map of the scene, showing how depth field imaging can break the tradeoff between aperture and depth of field for range imaging, in accordance with an illustrative embodiment of the invention.

The same techniques can be applied to depth fields. FIGS. 9(a-e) illustrates digital refocusing of the 4D φ(u, v, x, y) information by applying the same shear and then average operation. We are able to synthesize capture through a large virtual aperture for the scene, which has not been shown in depth maps before, and may be combined with wide aperture light intensity images for enhanced artistic/photographic effect. In addition, this validates that single-shot depth field sensors such as a TOF sensor with microlenses can allow more light through the aperture, thus increasing exposure while maintaining the same depth of field. This enables decreased acquisition time for TOF sensors at the expense of computationally recovering the lost spatial resolution and depth of field in post-processing algorithms.

Phase Wrapping Ambiguities

One main limitation for single frequency TOF is that the phase has $2\pi$ periodicity, and thus depth estimates will wrap around the modulation wavelength. For modulation frequencies in the tens of MHz, this corresponds to a depth range of a few meters, which can be extended further by using multiple frequencies or phase unwrapping algorithms. However, as modulation frequencies scale higher, phase wrapping becomes more severe.

We observe that capturing depth fields at a single modulation frequency also allows us to unwrap the phase periodicity by utilizing inherent epipolar geometry from different viewpoints. We use the depth from correspondence algorithm reported in M. W. Tao, S. Hadap, J. Malik, and R. Ramamoorthi, Depth from combining defocus and correspondence using light-field cameras, IEEE International Conference on Computer Vision (ICCV), pages 673-680, IEEE, 2013, which is coarse and distance dependent, but does not suffer from phase wrapping, and thus can unwrap the depth measurements given by TOF.

Figure 10:
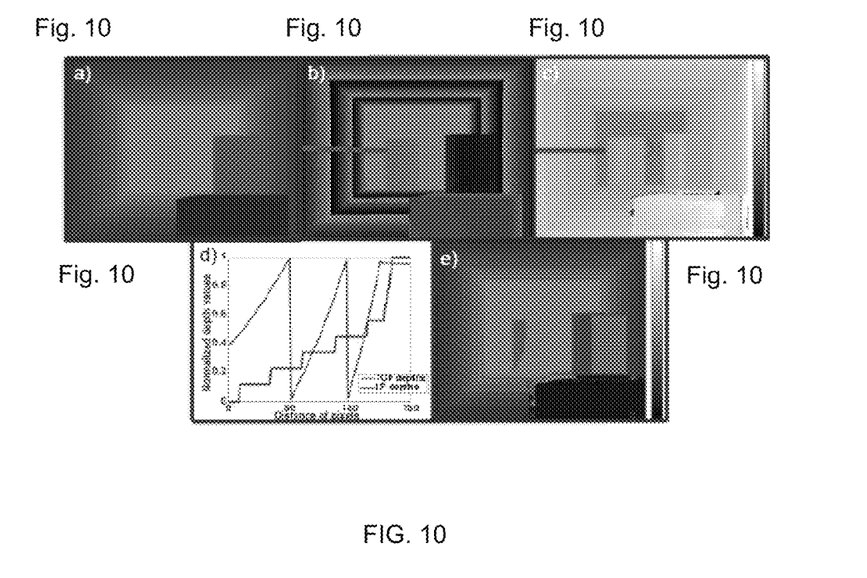
FIG. 10 illustrates using a phase unwrapping algorithm on synthetic data: a) box scene with ground truth depth values, b) a phase wrapped scene with fiducial line for calibration marked, c) depth map given by light field correspondence algorithm. We identify the same calibration line in this scene for phase unwrapping, d) we map the TOF wrapped values to the depth values from correspondence for the given calibration line, e) unwrapped depth map, in accordance with an illustrative embodiment of the invention.

FIGS. 10(a-e) illustrate using a phase unwrapping algorithm on synthetic data. FIG. 10a illustrates a simulated the box scene and a captured depth field using the ray tracer Mitsuba. In FIGS. 10b, e, we simulate phase wrapping and calculate depth from correspondence. In order to perform phase unwrapping, we select a continuous line in the image (the side wall in this scene) to determine the number of times the TOF image wraps upon itself in the scene. We use this mapping to match the wrapped TOF depth values to the depth values from correspondence, leading to unwrapped TOF depth values for the entire image as shown in FIG. 10d. We also use a median filter to alleviate edge discontinuities in calculating depth from correspondence. FIG. 10e shows the unwrapped depth map of the scene.

Refocusing Through Partial Occluders

The large synthetic aperture that can be synthesized by capturing 4D depth fields allows us to image past partial occluders in the foreground. This technique, which blurs out the foreground to reveal the background, has been shown in light fields to look through bushes and plants. We note that applying the same technique to the depth field works correctly for the albedo (one can see the object clearly while blurring out the foreground), but it does not work for the phase. This is because while visually we can perceptually tolerate some mixing of foreground and background color, this same mixing corrupts our phase measurements, leading to inaccurate depth values.

To solve this mixing problem when refocusing light fields, researchers have simply not added rays that are from the foreground when averaging over the sheared light field. A key assumption to their algorithm is that the foreground object rays are identified either by shooting continuous video or by constructing an epipolar image, finding the corresponding depths, and then separating foreground relative to the background. These algorithms are computationally expensive to identify the occluding objects pixels. In contrast, we utilize the depths directly captured via TOF measurements to construct a histogram of depths observed in the scene. We then can simply pick a foreground cluster using K-means or another computationally efficient clustering algorithm, which is faster than constructing an epipolar image, estimating line slopes, and then forming a histogram to do clustering.

Refocusing Past Scattering Media

While the discussion immediately above dealt with partial occluders that block the background for certain (u,v) viewpoints, other occluders such as scattering media or translucent objects are more difficult because they mix multiple phase measurements corresponding to different optical path lengths together at a single pixel. We approach the problem via coded TOF, specifically the depth selective codes reported by R. Tadano, A. Pediredla, and A. Veeraraghavan, Depth selective camera: A direct, on-chip, programmable technique for depth selectivity in photography, In IEEE International Conference on Computer Vision (ICCV), (Accepted) 2015. Coded TOF extends the capabilities of our depth field camera systems by imaging past scattering media, allowing us to then use spatial information to perform digital refocusing. We imaged through backscattering nets to get a depth field past the scattering media. We placed nets in front of the camera to act as strong backscatterers, which noticeably corrupted the depth values due to scattering. Using the depth selective codes, we were able to image past the nets, and using multiple shots at different (u, v) viewpoints, we could capture the depth field beyond the nets and do digital refocusing. We thus demonstrated how depth field imaging can leverage the advantages of coded TOF techniques.

Depth fields enable the unification of light field and TOF imaging as a single function of spatio-angular coordinates, and are useful for various applications. Besides the simple extensions of adding two imaging modalities, they can inform each other and make algorithms computationally more efficient and conceptually simpler, particularly in solving the problem of various occluders for light fields by using TOF information and breaking tradeoffs between aperture and depth of field for TOF cameras by adding light field capability. Improvements in light field depth estimation such as in can also be applied for depth field cameras leading to improved depth resolution.

A lingering question that concerns depth field cameras is their pixel size, which may make pixel multiplexing problematic. We note that TOF pixels have shrunk currently to 10 μm, which is only 10× larger than regular pixels (1 um), and that technological advances such as stacked image sensors may help alleviate these multiplexing worries. However, the clear advantages for depth field cameras are applications where spatial resolution is not the limiting factor. This includes imaging systems that are limited by aperture and lensless imaging where spatial pixel layout is not a factor.

Some limitations include long computational algorithms to recover lost spatial resolution for single-shot depth field cameras, or increased acquisition time for large TOF camera arrays or TOF cameras on mechanical gantries to scanline a depth field. Many applications provide partial robustness to depth sensing in the wild, but rely on modeling assumptions (foreground vs. background separation, scattering media is not immersing the object) that limit their deployment in real autonomous systems.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

We claim:

1. A depth field imaging apparatus for imaging a scene, comprising:
    a time-of-flight (TOF) imager comprising:
        a light source configured to emit light to illuminate the scene; and
        a plurality of TOF sensors configured to acquire a depth field image of the scene by detecting return light returned from the scene in response to the emitted light;
    light field (LF) optics disposed in a path of the return light and configured to spatially modulate the return light prior to detection of the return light by the plurality of TOF sensors,
    wherein the plurality of TOF sensors and the LF optics are implemented in a single on-chip architecture; and
    wherein the depth field image acquired by the plurality of TOF sensors contains LF information, encoded by the spatial modulation applied to the return light by the LF optics, and TOF information.

2. The depth field imaging apparatus of claim 1, wherein the LF optics comprises a grating.

3. The depth field imaging apparatus of claim 2, wherein the grating is a metallic grating.

4. The depth field imaging apparatus of claim 2, wherein the grating is a periodic grating.

5. The depth field imaging apparatus of claim 2, wherein the grating is a phase grating.

6. The depth field imaging apparatus of claim 5, wherein the phase grating is an anti-(odd)-symmetry phase grating.

7. The depth field imaging apparatus of claim 1, wherein the LF optics comprises a microlens.

8. The depth field imaging apparatus of claim 1, wherein the LF optics comprises an amplitude mask.

9. The depth field imaging apparatus of claim 1, wherein the plurality of TOF sensors comprises a plurality of photogates.

10. The depth field imaging apparatus of claim 9, wherein the plurality of photogates comprises interleaved photogates.

11. The depth field imaging apparatus of claim 9, wherein the light source is configured to modulate the emitted light at a modulation frequency, and the plurality of photogates is modulated at the modulation frequency to detect the return light.

12. The depth field imaging apparatus of claim 1, further comprising a lens disposed on an object side of the depth field imaging apparatus.

13. The depth field imaging apparatus of claim 1, implemented in a CMOS architecture.

14. The depth field imaging apparatus of claim 1, comprising an LF imaging operation mode, wherein the plurality of TOF sensors is configured to acquire an LF image of the scene by detecting scene light having passed through the LF optics.

15. The depth field imaging apparatus of claim 14, wherein the plurality of TOF sensors includes a plurality of photogates having a modulatable gate voltage, the modulatable gate voltage being held constant in the LF imaging mode.

16. A depth field pixel structure, comprising:
    a set of TOF sensors configured to acquire a depth field image of a scene by detecting return light returned from the scene in response to light illuminating the scene; and
    light field (LF) optics disposed in a path of the return light and configured to encode LF information into the return light prior to detection of the return light by the set of TOF sensors,
    wherein the set of TOF sensors and the LF optics are implemented in a single on-chip architecture.

17. A depth field imaging apparatus for imaging a scene, comprising:
    a time-of-flight (TOF) imager comprising:
        a light source configured to emit light to illuminate the scene; and
        a plurality of photogates configured to acquire a depth field image of the scene by detecting return light returned from the scene in response to the emitted light; and
    a diffraction grating configured to diffract the return light prior to detection of the return light by the plurality of photogates,
    wherein the plurality of photogates and the diffraction grating are implemented in a single on-chip architecture; and
    wherein the depth field image captured by the plurality of TOF sensors contains TOF information and the LF information encoded by the diffraction grating.

18. A method for imaging a scene, comprising:
    illuminating the scene with light emitted by a time-of-flight (TOF) light source;
    spatially modulating, with light field (LF) optics, return light returned from the scene in response to the emitted light; and
    acquiring a depth field image of scene by detecting the spatially modulated return light, the depth field image containing both LF information, encoded by the LF optics, and TOF information.

19. The method of claim 18, further comprising processing the depth field image to obtain an albedo map and a depth map of the scene as a function of plenoptic spatio-angular coordinates.

20. The method of claim 18, further comprising processing the depth field image using a digital refocusing technique.

21. The method of claim 18, further comprising processing the depth field image using a phase unwrapping technique.

22. A depth field imaging system, comprising:
    a light source configured to emit light to illuminate the scene; and an array of depth field pixel structures, each depth field pixel structure being implemented in a single on-chip architecture and comprising:
  a set of TOF sensors configured to acquire a depth field image of a scene by detecting return light returned from the scene in response to the emitted light; and
  light field (LF) optics disposed in a path of the return light and configured to encode, by spatial modulation, LF information into the return light prior to detection of the return light by the plurality of TOF sensors.

23. The depth field imaging system of claim 22, further comprising a lens disposed between the scene and the array of depth field pixel structures.

24. The depth field imaging system of claim 22, further comprising a global shutter.

* * * * *